United States Patent
Tokhtuev et al.

(10) Patent No.: US 8,191,703 B2
(45) Date of Patent: Jun. 5, 2012

(54) CONVEYOR SYSTEM MONITORING AND MAINTENANCE

(75) Inventors: Eugene Tokhtuev, Duluth, MN (US); Joseph P. Erickson, Cloquet, MN (US); Christopher J. Owen, Duluth, MN (US); Paul S. Schilling, Duluth, MN (US)

(73) Assignee: Ecolab USA Inc., St. Paul, MN (US)

( * ) Notice: Subject to any disclaimer, the term of this patent is extended or adjusted under 35 U.S.C. 154(b) by 126 days.

(21) Appl. No.: 12/708,067

(22) Filed: Feb. 18, 2010

(65) Prior Publication Data

US 2011/0198194 A1 Aug. 18, 2011

(51) Int. Cl.
*B65G 43/00* (2006.01)
(52) U.S. Cl. .................... 198/810.04; 198/813
(58) Field of Classification Search ............. 198/810.04, 198/813
See application file for complete search history.

(56) References Cited

U.S. PATENT DOCUMENTS

| | | | |
|---|---|---|---|
| 3,638,781 A * | 2/1972 | Comley | 198/810.04 |
| 4,533,856 A | 8/1985 | Malone | |
| 5,207,108 A | 5/1993 | Tassic | |
| 5,272,924 A | 12/1993 | Tassic et al. | |
| 5,482,154 A * | 1/1996 | Affeldt et al. | 198/810.04 |
| 5,689,092 A | 11/1997 | Wurz et al. | |
| 6,029,798 A * | 2/2000 | Miller | 198/810.04 |
| 6,137,974 A * | 10/2000 | Williams et al. | 198/810.04 |
| 6,851,546 B2 | 2/2005 | Lodge | |
| 2004/0226805 A1 | 11/2004 | Lodge | |
| 2005/0189200 A1* | 9/2005 | Hill et al. | 198/810.04 |
| 2010/0270130 A1* | 10/2010 | Tout | 198/810.04 |
| 2011/0079491 A1 | 4/2011 | Tokhtuev | |

FOREIGN PATENT DOCUMENTS

| | | |
|---|---|---|
| WO | 0132808 A1 | 5/2001 |
| WO | 02068310 A2 | 9/2002 |
| WO | 2007012796 A1 | 2/2007 |

OTHER PUBLICATIONS

Brochure, SmartLink Improving Chain Performance with Technology, Renold Power Transmission 2009, Ref: REN47/ENG/07.09, www.renold.com.
International Search and the Written Opinion, dated Aug. 26, 2011 for PCT Application No. PCT/IB2011/050674 7 pages).

* cited by examiner

*Primary Examiner* — James R Bidwell
(74) *Attorney, Agent, or Firm* — Fredrikson & Byron, PA

(57) ABSTRACT

Methods for initiating one or more maintenance procedures on a conveyer system employ a load cell assembly that is supported by a link of a conveyor chain of the system in order to collect tension measurements. According to preferred methods, one or more threshold values for a rate of change in tension along particular portions of a circuit, around which the chain is driven, and/or for a variation in tension profile, from one cycle to another around the circuit, are established for comparison with tension measurements that are collected and/or processed by the load cell assembly, in order to detect operating issues and initiate the appropriate maintenance procedure(s). According to some methods, plots of the rate of change of tension versus time are generated and displayed for an operator to view.

15 Claims, 5 Drawing Sheets

CONVEYOR SYSTEM MONITORING AND MAINTENANCE

TECHNICAL FIELD

The present disclosure pertains to conveyor systems and more particularly to methods for monitoring a conveyor chain of a conveyor system and for initiating one or more related maintenance procedures.

BACKGROUND

Monitoring tension in conveyor chains is known in the art, for example, by means of a tension load cell supported by a link of a conveyor chain, wherein measurements from the load cell are gathered, either on a periodic or a continuous basis. However there is a need for various monitoring methods that can facilitate the initiation of one or more appropriate maintenance procedures.

BRIEF DESCRIPTION OF THE DRAWINGS

The following drawings are illustrative of particular examples for enabling methods of the present invention, are descriptive of some of the methods, and are not intended to limit the scope of the invention. The drawings are not to scale (unless so stated) and are intended for use in conjunction with the explanations in the following detailed description. Methods will hereinafter be described in conjunction with the appended drawings, wherein like numerals denote like elements.

DETAILED DESCRIPTION

The following detailed description is exemplary in nature and is not intended to limit the scope, applicability, or configuration of the invention in any way. Rather, the following description provides practical illustrations for implementing disclosed methods of the present invention. Those skilled in the art will recognize that many of the examples provided have suitable alternatives.

Figure 1:
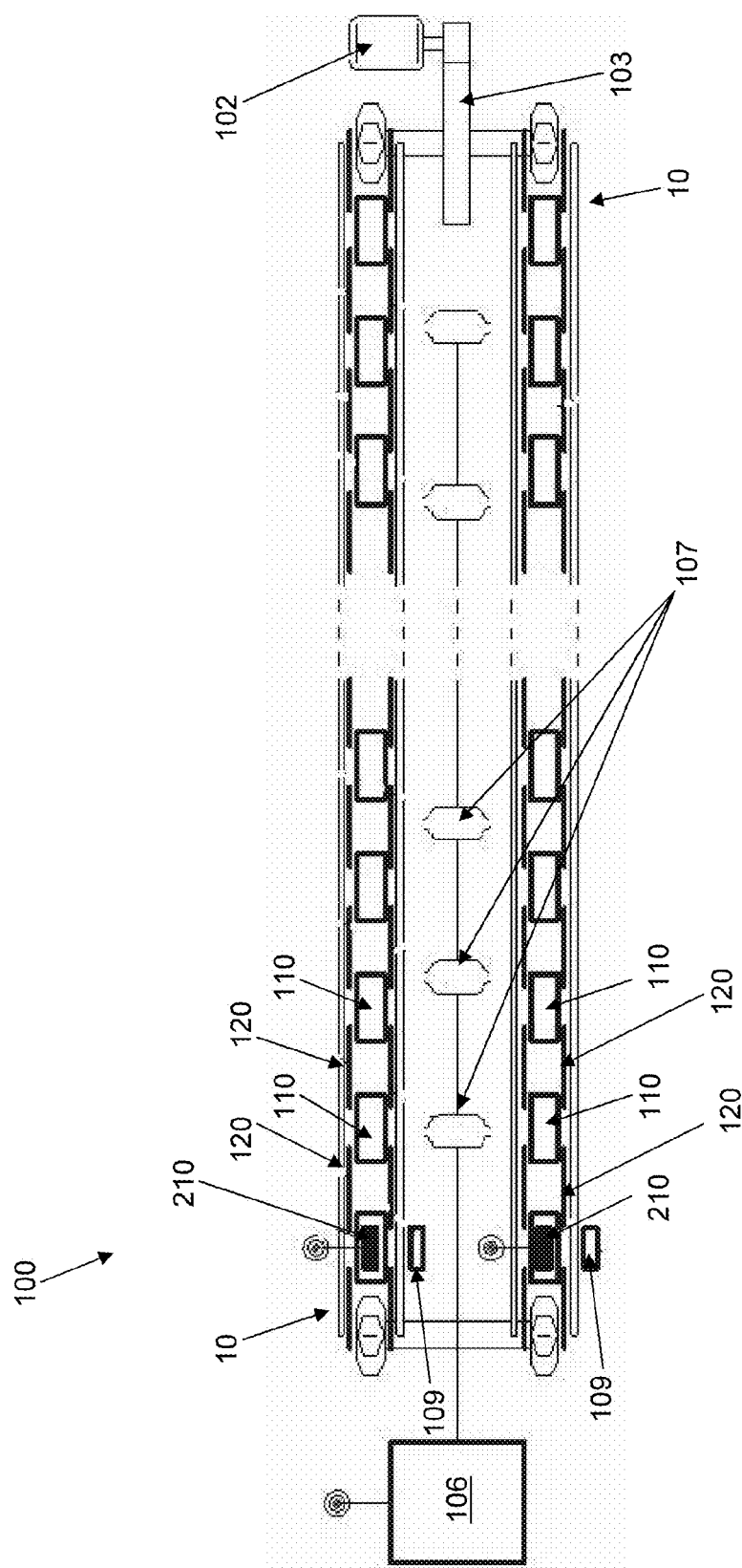
FIG. 1 is a plan view of an exemplary conveyor system.
Figure 2:
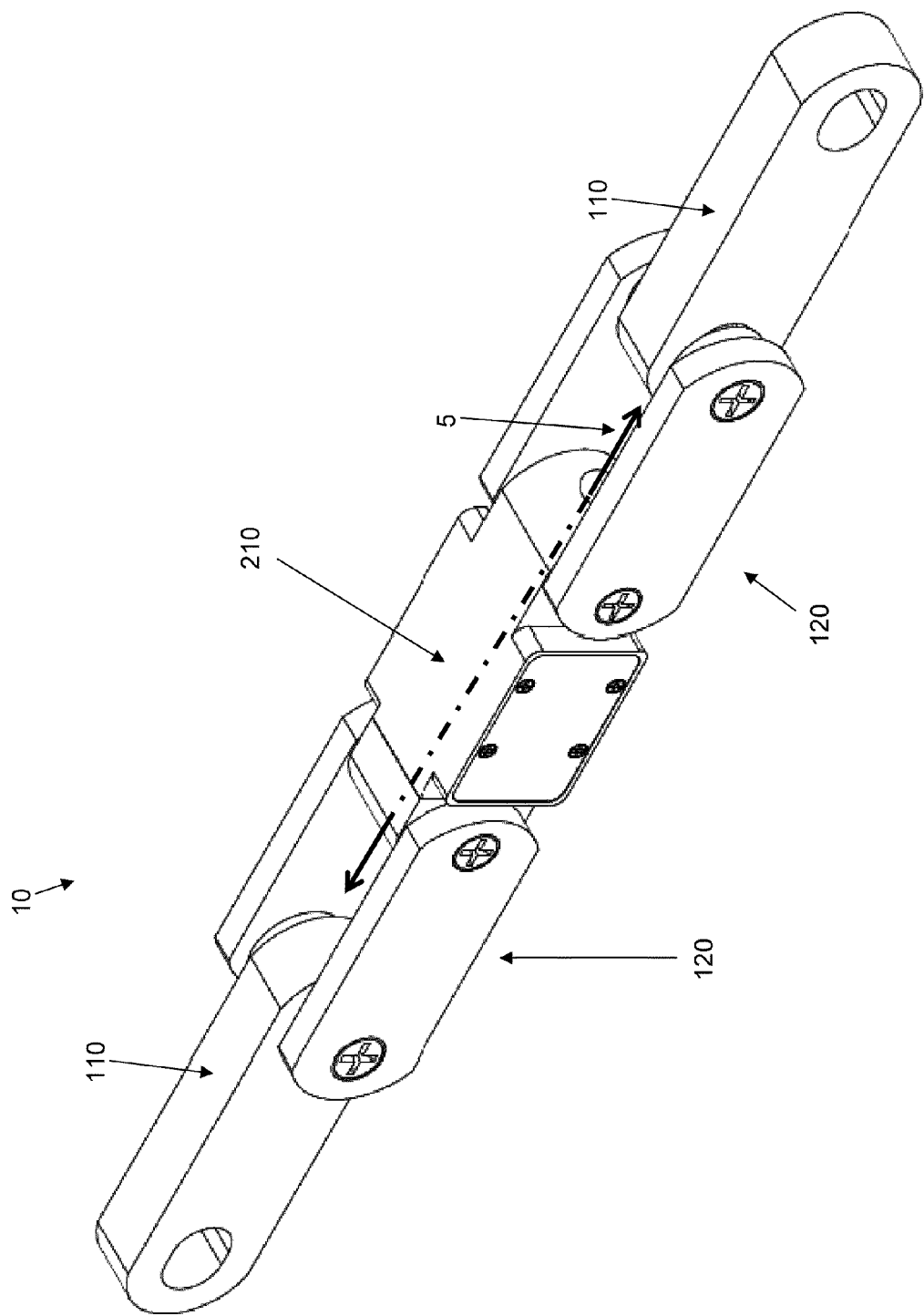
FIG. 2 is a perspective view of a portion of a conveyor chain that may be included in the system of FIG. 1 and employed by methods of the present invention.
Figure 3:
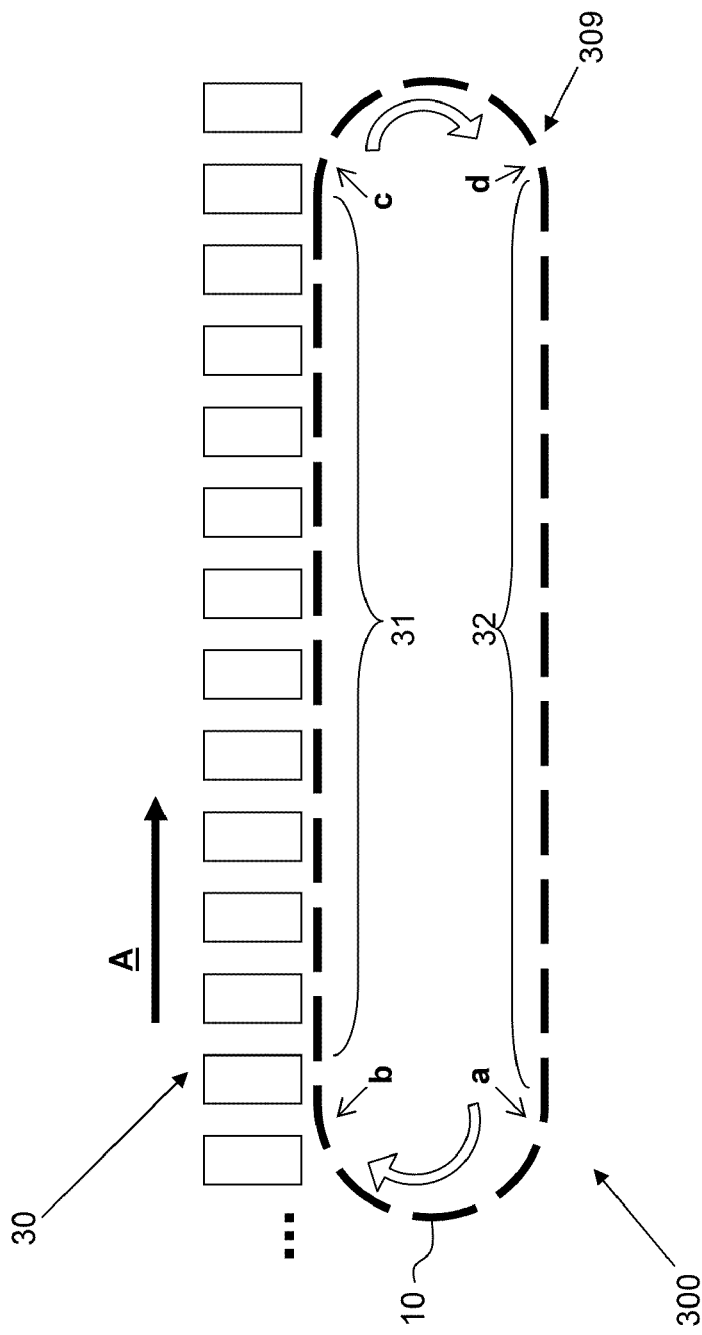
FIG. 3 is a schematic elevation view of a conveyor chain of the system of FIG. 1, according to some methods of the present invention.

FIG. 1 is a plan view of an exemplary conveyor system 100 in which a pair of conveyor chains 10 is employed. Each conveyor chain 10 may be constructed with alternating single links 110/210 and dual links 120, as is illustrated in FIG. 2. FIG. 1 illustrates an electric motor 102 and a gear unit 103, through which motor 102 works to drive conveyor chains 10, for example, via mating sprockets (not shown), around a circuit 300 of system 100, which is schematically illustrated in FIG. 3. FIG. 1 further illustrates conveyor chains 10 being guided in respective channels that are spaced apart from one another so that chains 10 may support and convey loads, for example, load 30, which is shown as a plurality of packages being conveyed, per arrow A, in FIG. 3.

Methods of the present invention preferably employ a load cell assembly, which is supported, for example, by single link 210 of each chain 10; the load cell assembly includes a load cell, which measures tension along a longitudinal axis 5 of each chain 10 (FIG. 2), and associated circuitry that facilitates the collection and processing of tension measurements. Such a load cell assembly is described in co-pending and commonly-assigned U.S. patent application Ser. No. 12/574,417, entitled "Conveyor Chain Tension Monitor", which was filed on Oct. 26, 2009 and is hereby incorporated by reference, in its entirety; however, methods of the present invention may employ different configurations of load assemblies that are known in the art, one example of which is the Smartlink™ available from Renold (www.renold.com). With further reference to FIG. 1, the circuitry of the load cell assembly, supported by link 210, is adapted to transmit collected tension measurements and processed tension measurements to a controller 106 and/or monitoring station of system 100, for example, as described in the aforementioned U.S. patent application Ser. No. 12/574,417.

FIG. 1 further illustrates system 100 including a permanent magnet 109 mounted alongside each of chains 10 to function in conjunction with a proximity sensor, that may be included in the corresponding link 210. According to the illustrated embodiment, when each link 210 comes into proximity with the corresponding magnet 109, the proximity sensor triggers power to the load cell assembly in link 210 for a predetermined period of time, which may or may not correspond to a predetermined number of runs of chain 10 past magnet 109, as detected by the proximity sensor.

Referring now to the schematic elevation view of one of conveyor chains 10 in FIG. 3, circuit 300, about which chain 10 is driven, is shown including an upper travel portion 31, over which chain 10 conveys load 30, and a lower return portion 32. According to preferred methods of the present invention, a position 309 is established along circuit 300, at which, when the load cell assembly of link 210 passes thereby, the load cell assembly begins collecting tension measurements at a predetermined sampling rate and for a predetermined period of time. Position 309 may correspond to a location of magnet 109 so that the collection of tension measurements begins immediately upon detection of magnet 109 by the proximity sensor in link 210. However, since conveyor chains 10 are preferably driven at a substantially constant speed around circuit 300, position 309 may be established at any point on circuit 300, since the amount of time between the detection of magnet 109 and each point on circuit 300 is known. FIG. 3 illustrates position 309 in proximity to a start of lower return portion 32, the location of which is generally designated with the letter "d". FIG. 3 further illustrates the letter "a" that generally designates the location of an end of lower return portion 32, the letter "b" that generally designates a starting portion, in proximity to a starting location of upper travel portion 31, and the letter "c" that generally designates an ending portion, in proximity to an ending location of upper travel portion 31.

Figure 4A:
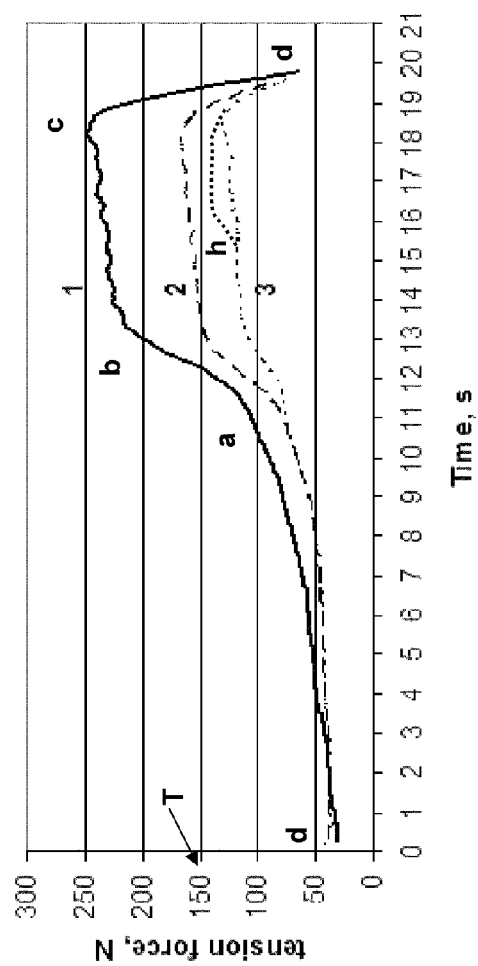
FIGS. 4A-B and 5 are various plots to illustrate, in conjunction with FIG. 3, alternate methods of the present invention.

Because position 309 is established for the start of tension measurement collection, and the sampling rate and speed of travel about circuit 300 are each substantially constant, each collected tension measurement may be associated with a location of the load cell assembly along circuit 300, for example, with respect to a, b, c and d. Turning now to FIG. 4A, examples of collected tension measurements are shown plotted for three operating conditions 1, 2 and 3 of a conveyor chain like conveyor chain 10. The three operating conditions are described as follows: operating condition 1 corresponds to a conveyed load, i.e. load 30 shown in FIG. 3, of approximately 150 kg, without lubricant present in the channel through which chain 10 is guided; operating condition 2 corresponds to the conveyed load of 150 kg, but with lubricant present in the channel; and operating condition 3 corresponds to a lower conveyed load of 80 kg, also with lubricant present in the channel. Overlaid on FIG. 4A are the letters a, b, c and d to designate, with reference to FIG. 3, the general location of the load cell assembly along circuit 300 where the corresponding tension measurements were made. Each plot may be representative of a group of measurements collected during a single cycle of the load cell assembly around circuit 300, or of multiple sub-groups of measurements collected during multiple cycles around circuit 300, under the same operating conditions, wherein each plotted tension measurement is an average of the corresponding tension measurement across the sub-groups.

According to some preferred methods of the present invention, at least one threshold value is established for a rate of change in tension (first derivative of tension with respect to time). The collected tension measurements, for example, those shown in each plot of FIG. 4A, are processed to calculate a rate of change in tension for successive tension measurements, and, then, the calculated rates of change in tension are compared to one or more of the at least one threshold value for rate of change in tension. It should be noted that successive tension measurements need not immediately follow one another. In order to illustrate two types of threshold values that may be established for the rate of change in tension, FIG. 4B shows plots of the rate of change in tension versus time, for each of the operating conditions 1, 2 and 3.

Figure 4B:
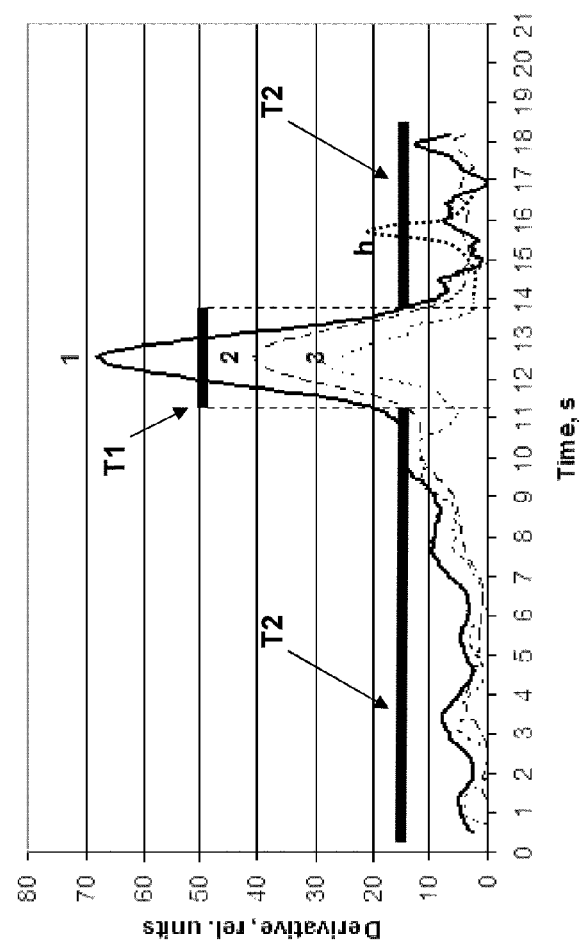

A first type of established threshold value T1, illustrated by FIG. 4B, is associated with the starting portion of circuit 300, which is designated by b in FIGS. 3 and 4A, and which corresponds to the starting location of upper travel portion 321. As link 210, which supports the load cell assembly, comes around circuit 300 from a to b and into the starting location of upper travel portion 321, the rate of change in tension necessarily increases, for all three operating conditions 1, 2 and 3, as the conveyed load 30 passes onto chain 10; yet, this increase in the rate of change in tension exceeds threshold value T1, for a given conveyed load, when the channel, through which chain 10 passes, is not lubricated, as is the case for operating condition 1. Thus, in order to detect inadequate lubrication, for a given conveyed load, for example, 150 kg, threshold value T1 may be established above a value that corresponds to the conveyed load with adequate lubrication, for example, the value corresponding to the peak associated with operating condition 2. (Although not illustrated, it should be understood that, if the given conveyed load is lower, for example, the 80 kg load of operating condition 3, the established threshold value T1 will likely be correspondingly lower.) Once the established threshold value T1 is exceeded, a corresponding maintenance procedure, that is, one that addresses the detected operating issue, is initiated, for example, lubrication to address the detection of inadequate lubrication. With reference back to FIG. 1, system 100 includes a plurality of lubricating units 107, which are shown spaced apart along a length of conveyor chains 10; and, according to some preferred methods of the present invention, controller 106 is adapted to activate lubricating units 107 once the established threshold value T1 is exceeded.

A second type of established threshold value T2, illustrated by FIG. 4B, is associated with one or both of upper travel portion 31 and lower return portion 32 of circuit 300. Threshold value T2 is established to detect local discontinuities in circuit 300 that impede smooth or efficient operation of conveyor chains 10 and/or cause excessive wear in chains 10. Examples of such discontinuities include, without limitation, a localized region of inadequate lubrication and a local obstruction of the channel through which chain 10 is guided.

With reference back to FIG. 4A, a hypothetical increase in tension force is shown for operating condition 3 as a dotted line that is designated with the letter "h". Such an increase, due to a local discontinuity along upper travel portion 31, between starting portion b and ending portion c, can be detected by monitoring the rate of change in tension and noting when this rate of change exceeds the established threshold T2, as is illustrated by the dotted line in FIG. 4B. As in the situation described above, when established threshold T2 is exceeded, a corresponding maintenance procedure is initiated in order to remove the local discontinuity. Examples of such maintenance procedures include, without limitation, lubrication at the local site, repair at the site, and removal of an obstructing object from the site.

According to some methods of the present invention, the load cell assembly of link 210, upon collecting a group of tension measurements, calculates the rate of change in tension for successive measurements, and compares each calculated rate of change to the at least one established threshold value, for example, one or both of threshold values T1, T2, in order to determine if any of the at least one threshold value (T1, T2) is exceeded, and, if so, sends a signal to controller 106, which, in turn, sends a signal to initiate one or more corresponding maintenance procedures. According to some alternate methods, controller 106 receives transmission of the group of collected tension measurements from the load cell assembly and performs the aforementioned steps of calculating and comparing in order to determine if any of the at least one threshold value (T1, T2) is exceeded. According to yet further methods, the load cell assembly calculates the rate of change in tension for successive collected tension measurements and transmits each rate of change in tension to controller 106, where the step of comparing each rate of change to the at least one threshold value (T1, T2) is carried out. In any of these cases, a predetermined schedule may be established for periodic collection and processing of tension measurements. In this regard, with reference back to the description associated with FIG. 1, it should be noted that magnets 109 and the proximity sensors in links 210, in addition to triggering power to the load cell assemblies, may also assist in synchronizing groups of collected measurements for multiple cycles around circuit 300, either when each cycle of the multiple cycles are separated by time periods in which no tension measurements are collected, or when a predetermined time period for the collection of tension measurements spans the multiple cycles.

System 100 may further include a monitoring station, for example, integrated with controller 106; and, according to yet further methods, plots of calculated rate of change in tension versus time are generated, either by the load cell assembly or by controller 106, for presentation on a display of the monitoring station. Thus, an operator of system 100 may monitor the rate of change in tension with respect to the at least one established threshold value, for example, by viewing plots similar to those shown in FIG. 4B, according to a predetermined monitoring schedule and protocol. For this situation, upon observation of one or more exceeded thresholds, the operator, rather than controller 106, may initiate the corresponding maintenance procedure(s).

Some methods of the present invention may further include establishing a threshold value T for tension, such that, if any tension measurement exceeds the established threshold value T, a corresponding maintenance procedure is initiated. For example, with reference to FIG. 4A, the threshold value T of 150 N may be applied across an entirety of a cycle around circuit 300, or just across one or more specific portions, depending upon what type of detection is desired. Plots, similar to those shown in FIG. 4A, may be generated and presented on a display of a monitoring station, as described above for the plots of FIG. 4B.

Figure 5:
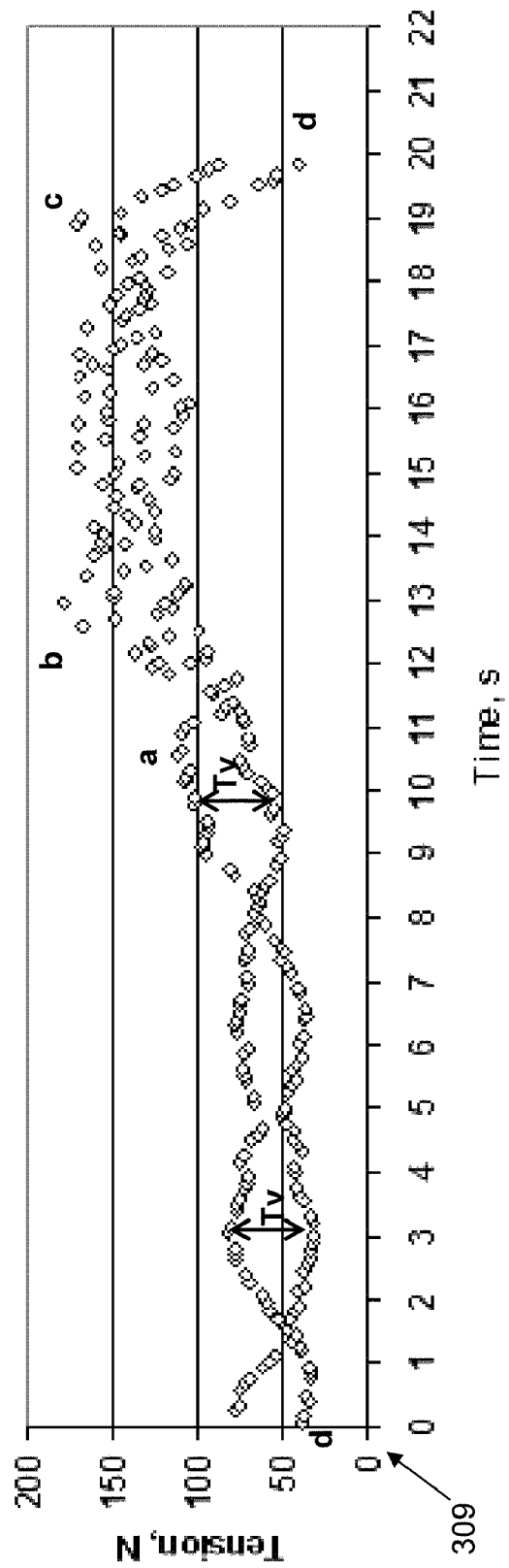

Turning now to FIG. 5, plots of multiple groups of tension measurements, which have all been collected at the same sampling rate, are shown, each registered to established position 309 and overlaid one upon another. The predetermined time for collection of the measurements shown in FIG. 5 spans multiple cycles around circuit 300, each group of collected measurements corresponds to one of the multiple cycles, and the conveyed load is substantially constant over the multiple cycles. Overlaid on FIG. 5 are the letters a, b, c and d to designate, with reference to FIG. 3, the general location of the load cell assembly along circuit 300 when the corresponding tension measurements were made. According to some additional methods of the present invention, a threshold value for variation between plots of groups of collected tension measurements is established in order to detect operating issues that require maintenance, for example, a maladjustment of conveyor chain 10. In FIG. 5, this threshold value is designated as Tv, which may be defined as a significant difference in tension, for at least two of the plots, at any single location, or at several locations. If the threshold value Tv is exceeded, a corresponding maintenance procedure is initiated in order to address the detected issue. According to some methods, plots similar to that shown in FIG. 5 are generated, either by the load cell assembly or by controller 106, for presentation on the display of the monitoring station, so that an operator of system 100 may monitor system 100 by viewing the displayed plots, determine if any variation in tension profile exceeds the threshold value Tv, and, if so, initiate the corresponding maintenance procedure.

In the foregoing detailed description, specific methods have been described. However, it may be appreciated that various modifications and changes can be made without departing from the scope of the invention as set forth in the appended claims.

The invention claimed is:

1. A method for initiating one or more maintenance procedures on a conveyor system, the method employing a load cell assembly of the conveyor system, the load cell assembly being supported by a link of a conveyor chain of the system so that the load cell assembly, when powered, can measure tension between opposing ends of the link, collect and process tension measurements and transmit the collected measurements and the processed measurements, the conveyor chain being driven around a circuit of the conveyor system at a substantially constant speed, the circuit including an upper travel portion, over which the conveyor chain conveys a load, and a lower, return portion, and the method comprising:
 establishing a position along the circuit, such that each tension measurement collected can be associated with a location along the circuit;
 establishing at least one threshold value for a rate of change in tension, each of the at least one threshold value being associated with a portion along the circuit;
 collecting, via the load cell assembly, a group of tension measurements;
 calculating a rate of change in tension for successive tension measurements from the group of tension measurements;
 comparing each calculated rate of change in tension to one or more of the at least one threshold value to determine if any calculated rate of change in tension exceeds one of the one or more of the at least one threshold value; and
 if any calculated rate of change in tension exceeds one of the one or more of the at least one threshold value,
 initiating a maintenance procedure that corresponds to the threshold value which is exceeded.

2. The method of claim 1, wherein:
 the at least one threshold value for the rate of change in tension comprises a threshold value associated with a starting portion of the circuit, the starting portion being in proximity to a starting location of the upper travel portion, at which the conveyed load passes onto the conveyor chain; and
 the maintenance procedure comprises lubricating a channel through which the conveyor chain passes along at least a portion of the circuit.

3. The method of claim 1, wherein:
 the at least one threshold value for the rate of change in tension comprises a threshold value associated with one or both of: the upper travel portion and the lower return portion; and
 the maintenance procedure comprises removing a discontinuity from a local site along the circuit.

4. The method of claim 1, wherein calculating the rate of change in tension and comparing each calculated rate of change in tension to one or more of the at least one established threshold value is carried out by the load cell assembly; and further comprising sending a signal from the load cell assembly, when any calculated rate of change in tension exceeds one of the one or more of the at least one threshold value, to a controller of the conveyor system, which, upon receipt of the signal, sends another signal to initiate the maintenance procedure.

5. The method of claim 1, further comprising:
 transmitting the group of collected tension measurements from the load cell assembly to a controller of the conveyor system; and
 wherein calculating the rate of change in tension and comparing each calculated rate of change in tension to one or more of the at least one threshold value is carried out by the controller.

6. The method of claim 5, wherein:
 initiating the maintenance procedure is carried out by the controller; and
 the maintenance procedure comprises lubricating a channel through which the conveyor chain passes along at least a portion of the circuit.

7. The method of claim 1, wherein:
 calculating the rate of change in tension is carried out by the load cell assembly and the load cell assembly transmits each calculated rate of change in tension to a controller of the conveyor system; and
 comparing each calculated rate of change in tension to one or more of the at least one threshold value is carried out by the controller.

8. The method of claim 7, wherein:
 initiating the maintenance procedure is carried out by the controller; and
 the maintenance procedure comprises lubricating a channel through which the conveyor chain passes along at least a portion of the circuit.

9. The method of claim 1, further comprising:
 generating a plot of the calculated rates of change in tension versus time and presenting the plot on a display of a monitoring station of the conveyor system for an operator to view; and
 viewing the displayed plot to compare each calculated rate of change in tension to one or more of the at least one threshold value.

10. The method of claim 1, further comprising:
 establishing a threshold value for tension;

comparing each tension measurement from the group of collected tension measurements to the threshold value for tension to determine if any tension measurement exceeds the threshold value; and if any tension measurement exceeds the threshold value, initiate a maintenance procedure that corresponds to the exceeded tension threshold value.

11. A method for initiating one or more maintenance procedures on a conveyor system, the method employing a load cell assembly of the conveyor system, the load cell assembly being supported by a link of a conveyor chain of the system so that the load cell assembly, when powered, can measure tension between opposing ends of the link, collect and process tension measurements and transmit the collected measurements and the processed measurements, the conveyor chain being driven around a circuit of the conveyor system at a substantially constant speed, the circuit including an upper travel portion, over which the chain conveys a load, and a lower return portion, and the method comprising:

establishing a position along the circuit, such that each tension measurement collected can be associated with a location along the circuit;

establishing a threshold value for variation between plots of groups of collected tension measurements;

collecting, via the load cell assembly, multiple groups of tension measurements over multiple cycles around the circuit;

generating a plot of tension measurements versus time for each group of collected tension measurements, such that the plots overlay one another, being registered according to the established position along the circuit;

presenting the plots on a display of a monitoring station of the conveyor system for an operator to view;

viewing the displayed plots to compare the collected measurements of each group and thereby determine if a variation between the plot of any two of the groups exceeds the established threshold value for variation; and if the variation between the plot of any two of the groups exceeds the threshold value, initiating a maintenance procedure that corresponds to the exceeded threshold value.

12. A method for monitoring tension in a conveyor chain of a conveyor system, the method employing a load cell assembly of the conveyor system, the load cell assembly being supported by a link of the conveyor chain so that the load cell assembly, when powered, can measure tension between opposing ends of the link, collect and process tension measurements and transmit the collected measurements and the processed measurements, the conveyor chain being driven around a circuit of the conveyor system at a substantially constant speed, and the method comprising:

collecting, via the load cell assembly, a group of tension measurements according to a predetermined sampling rate and over a predetermined period of time;

calculating a rate of change in tension for successive tension measurements from the group of tension measurements;

generating a plot of the calculated rates of change in tension versus time; and presenting the plot on a display of a monitoring station of the conveyor system for an operator to view.

13. The method of claim 12, further comprising:

establishing a position along the circuit, at which, when the load cell assembly passes thereby, the load cell assembly begins collecting the group of tension measurements; and registering the presented plot according to the established position along the circuit so that each calculated rate of change in tension can be associated with a location along the circuit.

14. The method of claim 13, wherein:

the predetermined period of time spans multiple cycles around the circuit;

the group of collected tension measurements comprises multiple sub-groups, each sub-group corresponding to one of the multiple cycles around the circuit such that a first measurement for each sub-group corresponds to the established position along the circuit; and each successive tension measurement comprises an average of the corresponding tension measurements across the sub-groups.

15. The method of claim 12, further comprising:

establishing a position along the circuit, at which, when the load cell assembly passes thereby, the load cell assembly begins collecting the group of tension measurements, such that each collected tension measurement can be associated with a location along the circuit; and generating a plot of the group of collected tension measurements versus time; and presenting the plot of the group of collected tension measurements on the display of the monitoring station for the operator to view;

wherein the predetermined time spans multiple cycles around the circuit;

the group of collected tension measurements comprises multiple sub-groups, each sub-group corresponding to one of the multiple cycles around the circuit such that a first measurement collected for each sub-group corresponds to the established position along the circuit; and the plot of the group of collected tension measurements versus time comprises multiple sub-plots overlaying one another, each sub-plot corresponding to a sub-group and being registered according to the established position along the circuit.

* * * * *